US008727015B1

(12) United States Patent
Oddo

(10) Patent No.: US 8,727,015 B1
(45) Date of Patent: May 20, 2014

(54) METHOD AND APPARATUS OF MOUNTING A VALVE ON A FLANGE WITH FLEXIBLE BOLTS TO STOP OIL FLOW FROM A RUPTURED PIPE OR DEVICE

(71) Applicant: Phillip J. Oddo, Mandeville, LA (US)

(72) Inventor: Phillip J. Oddo, Mandeville, LA (US)

(*) Notice: Subject to any disclaimer, the term of this patent is extended or adjusted under 35 U.S.C. 154(b) by 0 days.

(21) Appl. No.: 13/852,701

(22) Filed: Mar. 28, 2013

Related U.S. Application Data

(63) Continuation of application No. 12/842,607, filed on Jul. 23, 2010, now Pat. No. 8,408,310.

(51) Int. Cl.
*E21B 23/00* (2006.01)

(52) U.S. Cl.
USPC .......................................... 166/364; 166/277

(58) Field of Classification Search
USPC .......................................... 166/277, 363, 364
See application file for complete search history.

(56) References Cited

U.S. PATENT DOCUMENTS

| 4,840,346 | A | | 6/1989 | Adnyana et al. | |
|---|---|---|---|---|---|
| 5,238,022 | A | * | 8/1993 | Zink | 137/554 |
| 7,779,921 | B2 | * | 8/2010 | Cain et al. | 166/379 |
| 8,210,264 | B2 | | 7/2012 | Mohr | |
| 8,297,359 | B2 | * | 10/2012 | McKay et al. | 166/359 |
| 8,408,310 | B1 | | 4/2013 | Oddo | |
| 2010/0307748 | A1 | | 12/2010 | Casciaro et al. | |

* cited by examiner

*Primary Examiner* — William P Neuder
(74) *Attorney, Agent, or Firm* — Garvey, Smith, Nehrbass & North, L.L.C.; Gregory C. Smith; Julia M. FitzPatrick

(57) ABSTRACT

A method and apparatus for stopping oil flowing from the end of a ruptured pipe, by mounting a flange on the end of the ruptured, if a flange is not already present; providing a gate valve having a flange on its lower end to mate with the flange on the ruptured pipe; providing a permanently affixed gasket member on the mounting flange of the gate valve; lowering the gate valve to the depth of the flowing oil from the ruptured pipe; providing at least two flexible bolts through opposite openings in the flange of the gate valve; threading each flexible bolt through two opposite openings in the flange of the ruptured pipe; placing pulling pressure on the lower ends of the two flexible bolts to pull the gate valve from a position adjacent the ruptured pipe to a second position where the gasket of the gate valve mounts against the face of the flange of the ruptured pipe, while the gate valve is in the open position; continuing to hold the gate valve in place by the flexible bolts while inserting permanent bolts in the remaining openings of the mated flanges to secure the gate valve permanently in place; and closing the gate valve to stop the flow of oil.

4 Claims, 6 Drawing Sheets

US 8,727,015 B1

METHOD AND APPARATUS OF MOUNTING A VALVE ON A FLANGE WITH FLEXIBLE BOLTS TO STOP OIL FLOW FROM A RUPTURED PIPE OR DEVICE

CROSS-REFERENCE TO RELATED APPLICATIONS

This is a continuation of U.S. patent application Ser. No. 12/842,607, filed Jul. 23, 2010 (issuing as U.S. Pat. No. 8,408,310 on Apr. 2, 2013), which is hereby incorporated herein by reference.

Priority of U.S. patent application Ser. No. 12/842,607, filed Jul. 23, 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to mounting a valve to a flange. More particularly, the present invention relates to a method and apparatus for mounting a valve, such as a gate valve, onto a flange of a pipe which is spewing oil, using flexible bolts in order to position the valve over the flange and not interfere with the flow until the valve is permanently mounted.

2. General Background

One of the more difficult problems in the oil and gas industry is drilling in bodies of water and the fear that a blowout would occur and the oil would leak into the body of water and endanger the environment, wildlife and human life. Of course, most recently, that event occurred exactly when a deep well owned by British Petroleum caught fire and sank and the riser pipe in which the oil was being recovered onto the rig was torn away from the rig and oil began to flow from the formation into the riser into the Gulf of Mexico at a depth of approximately 5,000 feet. That flow of oil has continued and does continue on as this application is being prepared with the oil rising through the 5,000 feet of water and reaching the surface where the oil being lighter than water floats on the water until after a certain amount of time the oil through the use of dispersants or other chemical activity become slightly heavier and begins to sink into the water and then must be recovered in another fashion.

Currently, the most common means of trying to recover the oil is to corral it in a system of booms and to set fire to the oil and oil which cannot burn or will not burn is then kept from the beaches and land and marshes until in fact it either sinks below the surface or it is in fact recovered. Therefore, there appears to be a need in the industry for a system that can stop the flow through a malfunctioning blowout preventer before the oil flows into the open water.

SUMMARY OF THE PRESENT INVENTION

The system of the present invention solves the problems in the art in a simple and straightforward manner. What is provided is a method providing a flange on the upper end of a blowout preventer resting on the ocean floor; lowering a valve such as a gate valve having a mating flange on the lower end to mate with the flange of the BOP; providing at least two flexible bolts threaded through the flange of the gate valve and threaded through two openings of the flange of the BOP while the gate valve is offset from the BOP so that the gate valve does not interrupt oil flow; securing the lower end of the flexible bolts and pulling the bolts so that the gate valve is pulled up against the mounting flange of the BOP; while held in place securing permanent bolts between the gate valve and the BOP so as to effect a permanent seal while the gate valve is still in the open position, and finally, closing the gate valve to shut off the flow of oil out through the BOP. An additional embodiment of the invention also includes at least two latching members into at least two bolt openings in the valve flange, so that when the valve flange is pulled against the flange of the BOP, a spring-loaded, moveable latch on each latching member engages against the lower face of the BOP flange and secures the valve against the BOP until permanent bolts can be installed.

Therefore, it is the principal object of the present invention to provide a method for mounting a valve on the top of a BOP which is spewing oil without interrupting the oil flow through the BOP during the mounting process;

It is the further object of the present invention to provide a method for securing a gate valve atop a BOP spewing oil with the use of flexible bolts so as to allow the gate valve to slide on to the BOP with minimal disruption of oil flow during the mounting process;

It is the further object of the present invention to provide a system whereby a gate valve can be mounted onto a BOP spewing oil without interrupting the oil flow until the valve is permanently secured on the BOP and the gate valve can be closed.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

Figure 1:
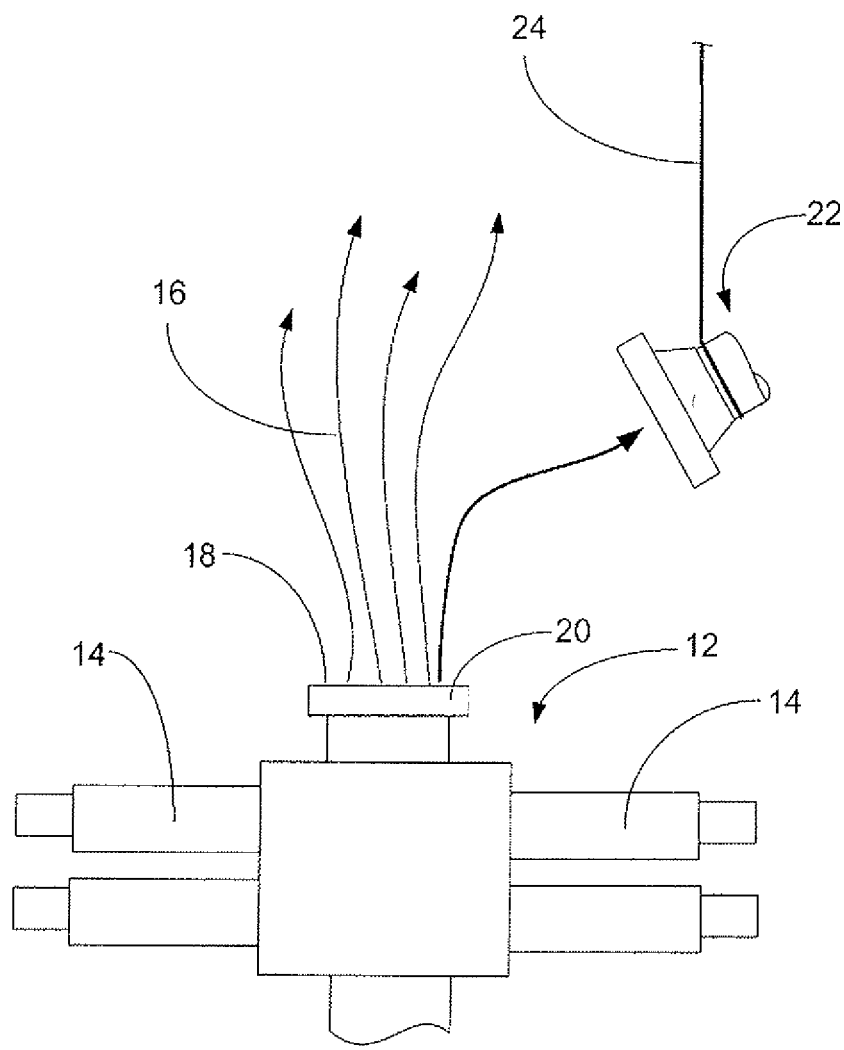
FIG. 1 illustrates a partial view of a BOP spewing oil with a partial view of a gate valve being lowered from the surface of the ocean.
Figure 4:
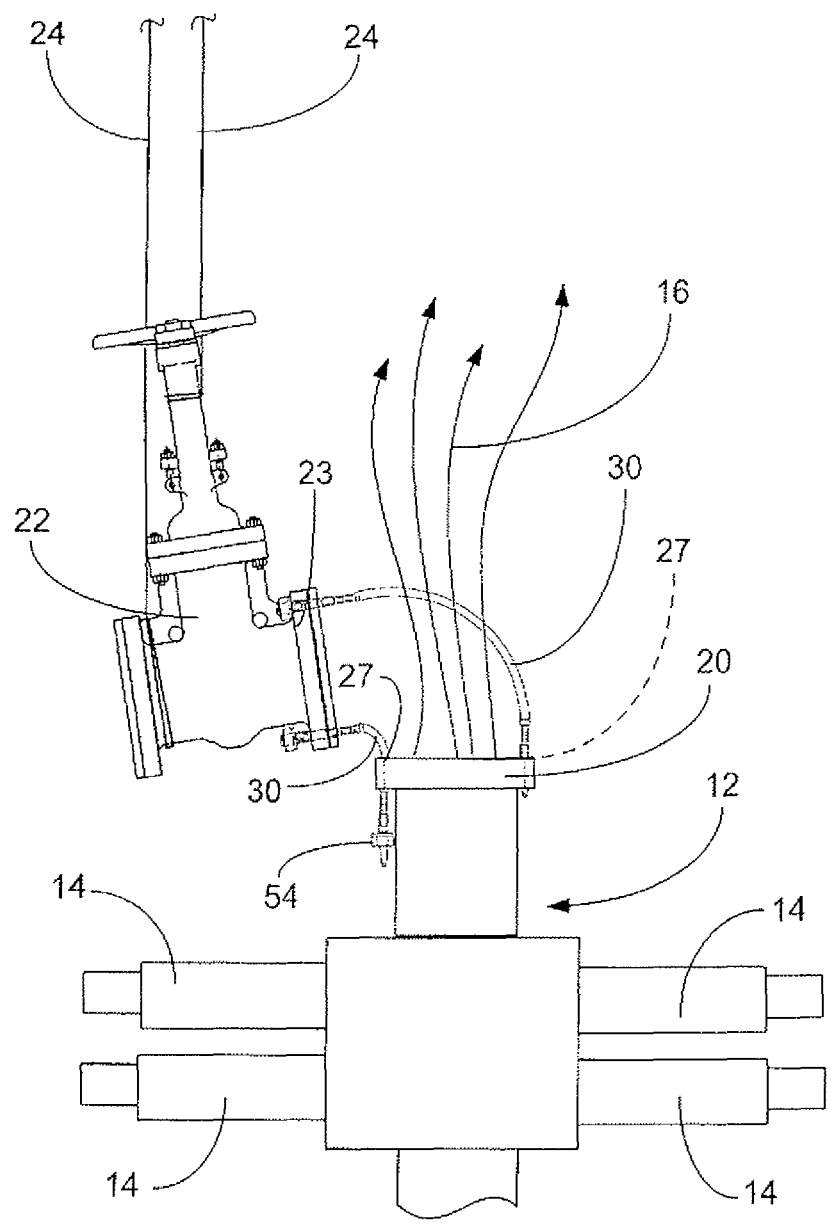
FIG. 4 illustrates the gate valve offset from the BOP while the flexible bolts are being secured through the BOP flange.
Figure 5:
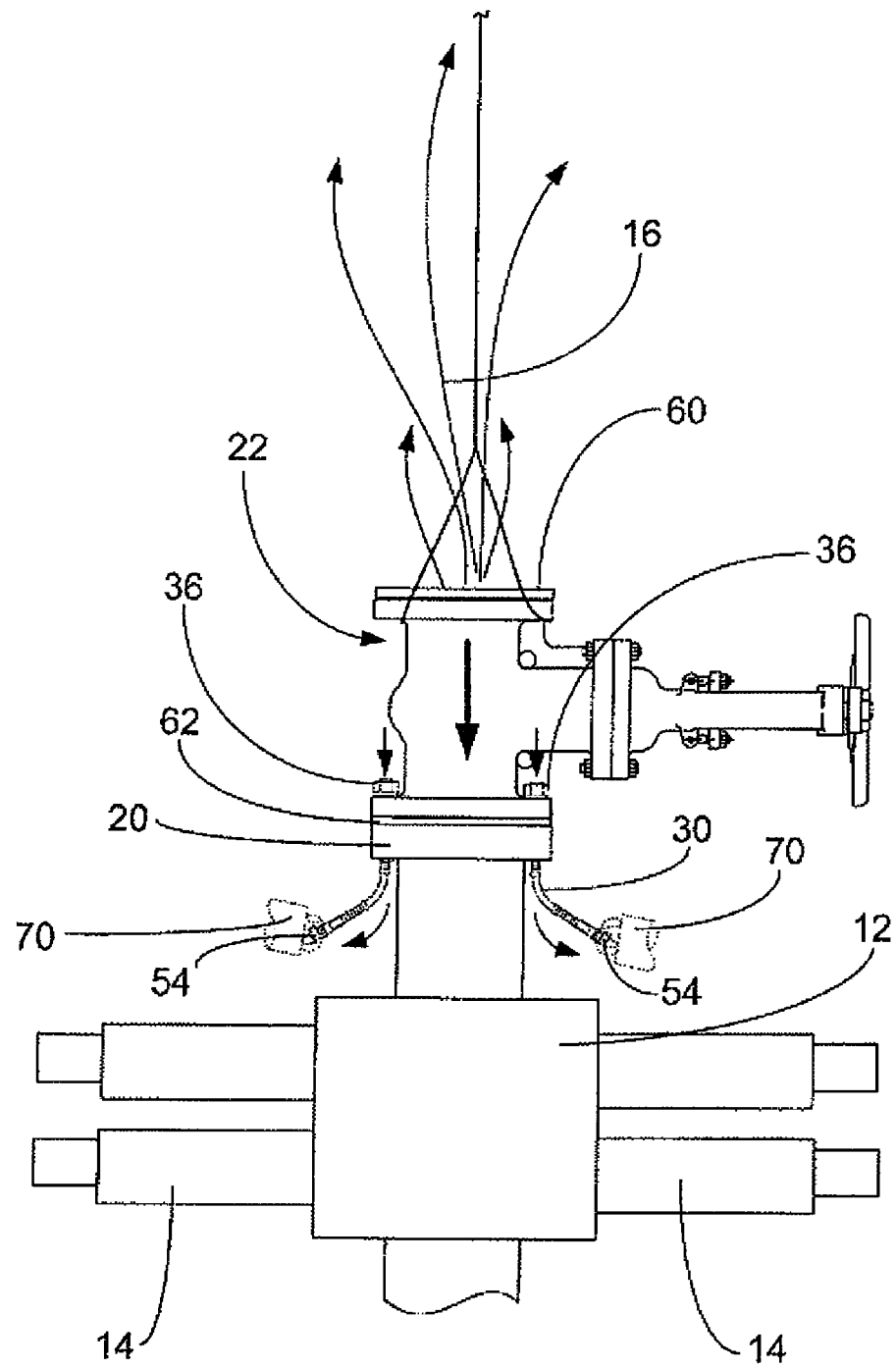
FIG. 5 illustrates the gate valve having been secured onto the BOP through robotic members pulling on the flexible bolts.
Figure 6:
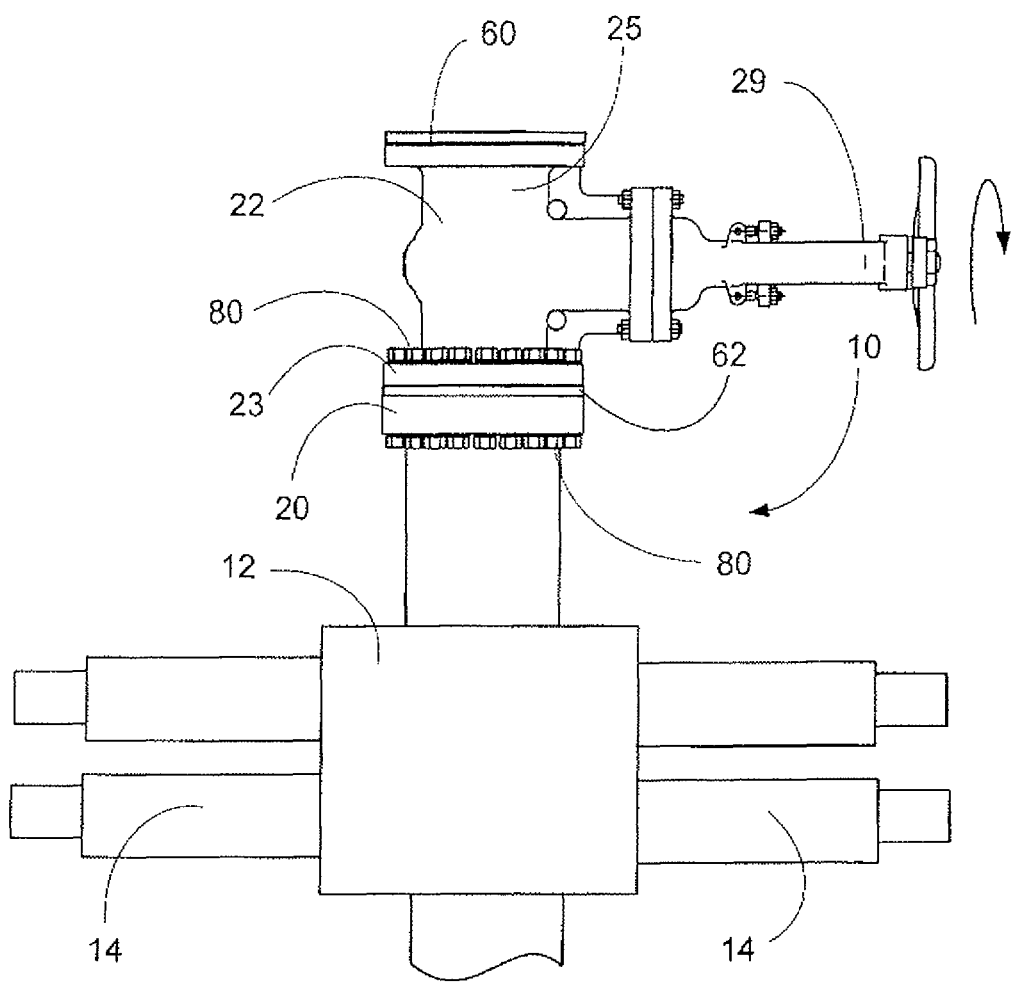
FIG. 6 illustrates the gate valve held in place with the permanent bolts and the gate valve closed for stopping the flow of oil.

FIGS. 1-9 illustrate the preferred embodiment of the system and method of the present invention by the numeral 10 after the gate valve has been secured onto the BOP as seen in FIG. 6. However, prior to that completed system, reference is first made to FIG. 1 where is illustrated a partial view of a typical blowout preventer 12 (hereinafter BOP 12) which is mounted on the ocean floor when the rams 14 failed to close so that oil 16 is spewing from the upper end 18 of the BOP 12, which has an upper mounting flange 20 secured thereupon. FIG. 1 also illustrates a partial view of a typical gate valve 22 being lowered from a cable from the surface ship to the level of the BOP 12, although the valve 22 could be lowered via robotic devices, if necessary. All of the mounting and securing of this valve 22 to the BOP 12 will be done by robotic instruments in view of the fact that this is being foreseen at a depth of approximately 5,000 feet below the surface of the water.

Figures 2, 3:
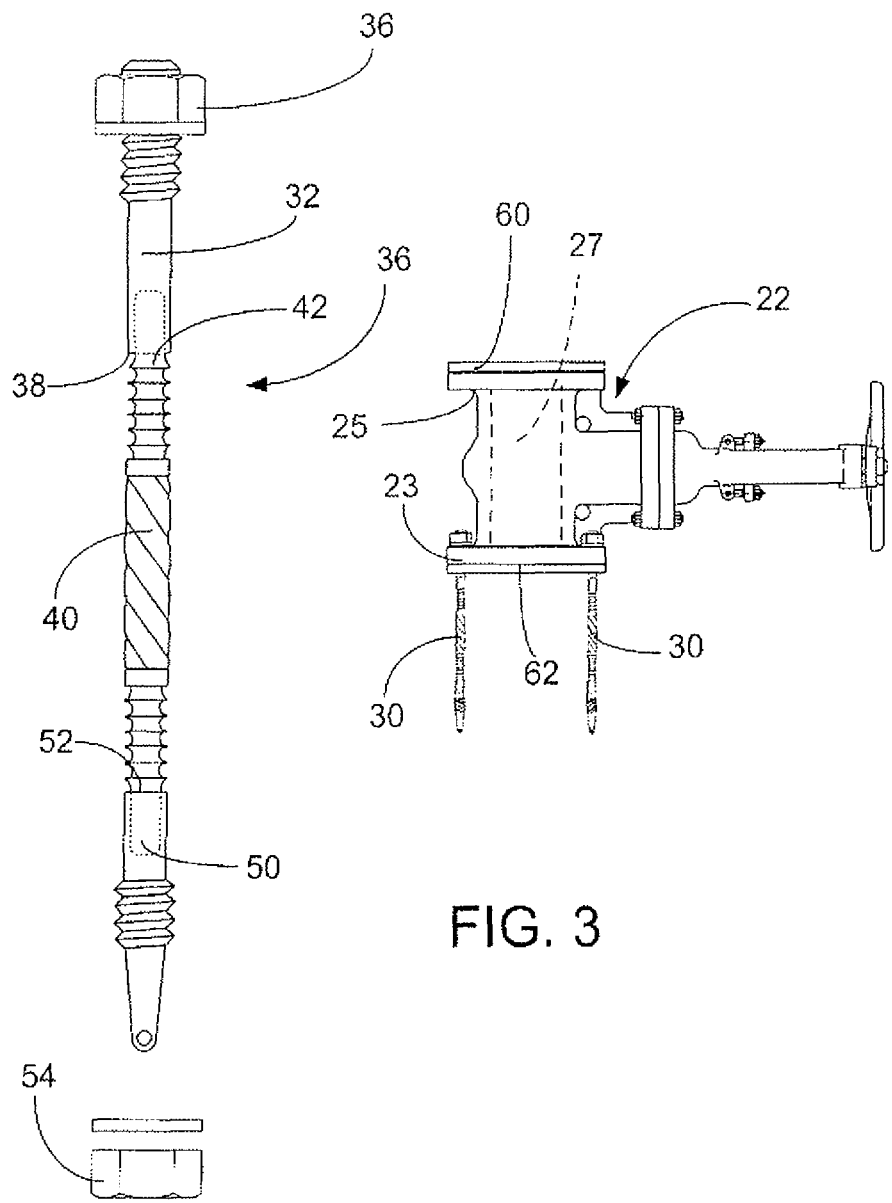
FIG. 2 illustrates a sample of a flexible bolt of the type used in the present invention.
FIG. 3 illustrates the flexible bolts threaded through the gate valve prior to being lowered onto the BOP.

Turning now to FIG. 2, there is illustrated what is called a "flexible bolt" 30 which includes an upper solid stud member 32 having a threaded end 34 with a nut 36 secured thereupon. The lower end 38 of the upper portion of the stud member 32 has been drilled out, and there has been inserted therein a flexible length of wire cable 40 into the lower end 38 of the upper stud 32 and crimped in place as seen via crimps 42. Likewise there is provided a lower stud member 50 which is likewise been secured into an opening in the upper end 52 of the lower stud member 50 and again has been crimped in place so that there is defined a continuous flexible mounting bolt 30 with a center portion 40 to allow the stud 30 to bend and twist for the reasons as will be discussed further. FIG. 2 also illustrates a lower nut member 54 which is secured to the lower end of the stud 50.

Turning now to FIG. 3, it is illustrated that the two or more flexible bolts 30 have been slid into a lower mounting flange 23 of the gate valve 22 as ready to be lowered onto the BOP 12. For purposes of construction, it should be noted that there are affixed upper and lower gaskets 60 and 62 which are secured to the lower flange 23 and the upper end 25 of gate valve 22 through vulcanization process, or the like, due to the fact that the oil spewing from the BOP 12. If the gaskets 60, 62 were not secured in such away, they would be torn away form the gate valve 22, which would cause further leakage.

Also, the interior flow bore 27 of the gate valve 22, through which the oil is flowing, as seen in FIG. 3, has been highly polished so that it offers the least resistance to the flow of the oil 16 through the valve 22, so that the valve can be more easily lowered onto the BOP 12 while the oil 16 is spewing therethrough.

Turning now to FIG. 4, there is illustrated the gate valve 22 positioned on the side of the flow of oil 16 from the top end 18 of the BOP 12. As illustrated, the two flexible bolts 30 have the ability to be threaded through the flange 20 of the BOP 12 while the gate valve 22 is still offset from the flow of oil as seen in FIG. 4. This is possible because the flexible bolts 30 may be of a length of up to 4 to 5 feet, if necessary, in order to allow the robotic instruments to thread the lower end 39 of each flexible bolts 30 through the BOP upper flange while the gate valve 22 is offset from the flow of oil through the BOP 12. Once the flexible bolts 30 have been threaded through the openings 27 of the upper flange of BOP 12, each lower end of the flexible bolts 30 would have the nut 36 threaded thereupon so that the robotic arms 70 could grasp the threaded bolts 30 at the threaded nut portion and pull down, in order to pull the gate valve 22 against the upper flange 20 of the BOP 12, as seen in FIG. 5. While the robotic arms 70 would be holding the gate valve 22 against the BOP 12, the oil 16 would continue to flow through the bore 21 of the gate valve 22. At this point, other robotic instruments 70 would place permanent bolts 80 through other openings 27 between the flanges of the gate valve 22 and the BOP 12, and these would be permanent mounting bolts which would permanently secure the gate valve 22 against the BOP 12, with the seal being permanently fixed by the gaskets 62.

Finally, as seen in FIG. 6, after the gate valve 22 has been mounted thereupon with permanent bolts, the valving member 29 of the gate valve 22 would be turned by the robotic instruments 70, which would then close the gate valving member 29 within the gate valve 22 which is quite typical in all gate valves, and the flow of oil 16 would be stopped.

Method of Installation of System

In the installation of the system 10 one would make the two flexible studs 30 about 24 inches long according to the drawings. One would use a stud and nut on the valve side. It is important to pass these flexible bolts 30 into bolt holes on opposite sides of the bottom flange of the gate valve 22. Install the nut at the valve. Next, remove the flange and broken pipe presently on top of the blowout preventer. Next, load the apparatus 10 onto a robotic unit. When installing keep the valve out of the path of the escaping oil of the blowout preventer. Use a secondary robot to thread the flexible bolt 30 through the existing bolt holes on the top of the blowout preventer. When threading is complete on both sides, install a nut on the bottom of the flexible studs in the event the unit or valve gets loose which aligning the valve with the hole in the preventer. Next, move the valve in line with the preventer with the gate valve fully open. A second robot must pull on the bottom of the flexible bolts to bring the valve to the top of the preventer. The mounting holes should align at this point. Pressure of the grab of the robot should hold the valve of the BOP long enough to begin the bolt down process. Next, install permanent bolts through other holes and fasten the preventer to the gate valve. Slowly close the gate valve which would stop the flow of oil.

It should be noted that the gaskets on the gate valve should be permanently bonded through vulcanization to the bottom and top of the gate valve to prevent the gaskets form flopping around or closing off the bolt holes. All bolt holes will be needed to retain the pressure from below. It would be important to grind and polish the inside of the gate valve to lessen flow turbulence, therefore making handling and alignment easier. When the valve comes into contact with the BOP, hold down pressure of the valve to the BOP should lessen significantly making bolt down tasks easier. One would make the stud ends as short as possible (preferably 3 to 4 inches long) while saving the integrity of the crimpable metal. The only reason for using nuts on the bottom of the flexible studs is that in the event the valve gets away, it would not have to be re-threaded. The use of flexible studs with nuts would allow removal of these flexible studs and replace them with regular bolts that can be tightened with the other bolts that are now in place to hold a valve against the blowout preventer.

Figure 7:
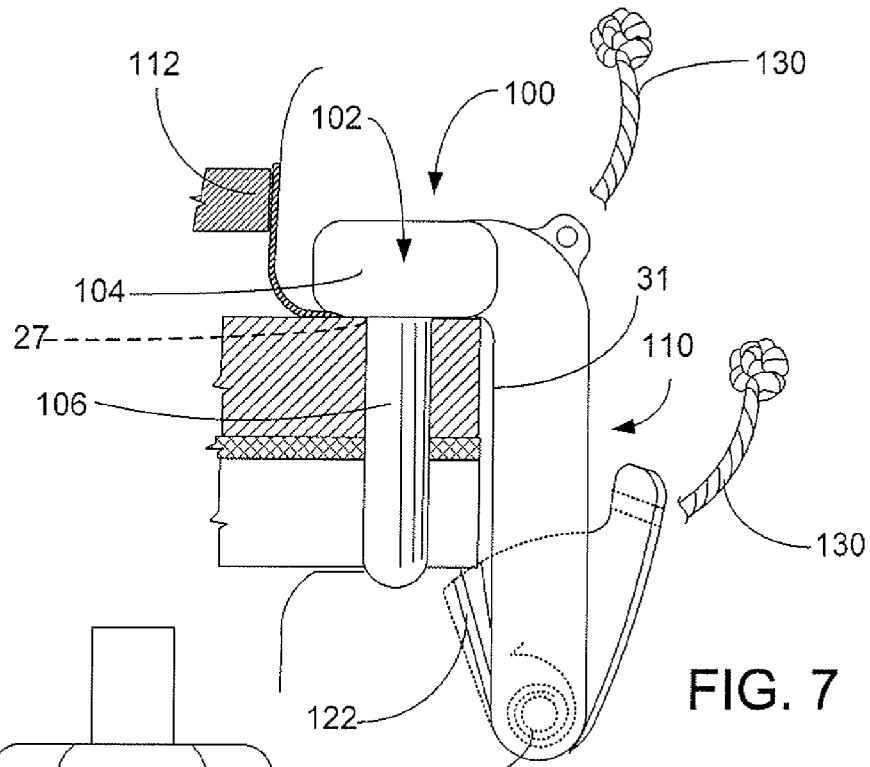
FIGS. 7 and 8 illustrate a latching feature in an additional embodiment of the present invention.
Figure 8:
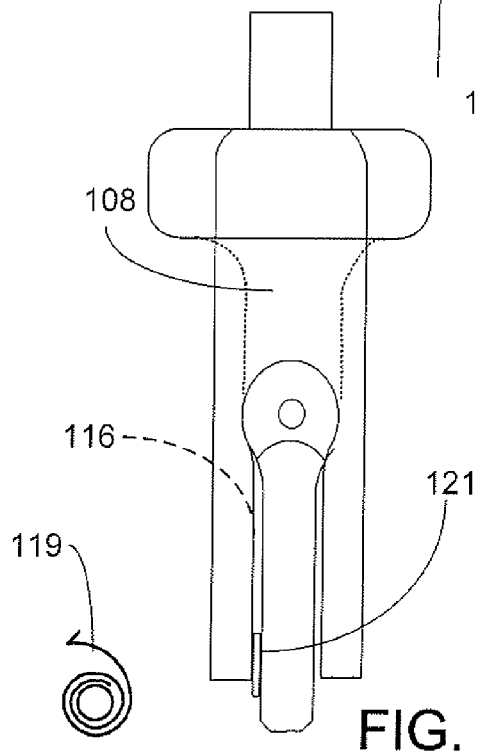
Figure 9:
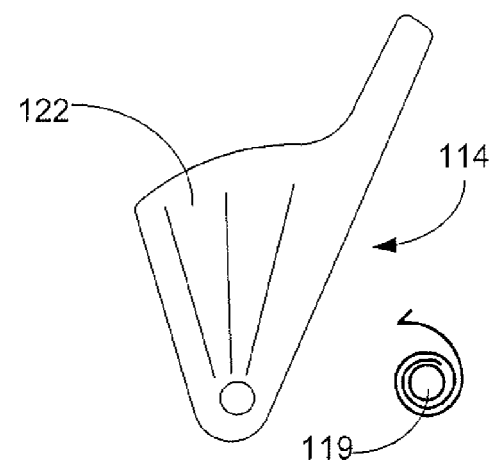
FIG. 9 illustrates an isolated view of the latch member as seen in FIGS. 7 and 8.

FIGS. 7 through 9 illustrate an additional embodiment of the present invention to be utilized in assuring proper installation of the valve 22 onto the top of the BOP 12. The figures illustrate a feature referred to as a quick latch 100 which would be engaged to the flange 23 of the valve 22 before it is lowered into the ocean for installation. As seen in FIG. 7, the quick latch 100 includes a stud member 102 which would have a head 104 and a shaft portion 106 which would be engaged into one of the bolt openings 27 in the flange 23 of the valve 22. Preferably, there would be three latches 100 equally spaced around the flange 23, although two flanges 100 spaced equally apart may suffice. As seen in FIG. 7, a quick latch body portion 108 would rest along the outer face 31 of the flange 23, housing a spring loaded latch member 110 for reasons discussed below.

Each of the three quick latches 100 would be held into position on the flange as seen in FIG. 7 by a tear away sheet metal strap 112 around the outer wall of the valve 22 above the flange 23, so that the quick latches 100 do not become disengaged from the valve 22 during installation of the valve as discussed in FIGS. 1 through 6. One very important feature of each quick latch 100 is a spring loaded latching member 114, shown in FIG. 9, which would be pivotally installed in an opening 116 in body portion 108, as seen in FIG. 8. A coiled spring 119 around the latch pin 121, upon which latch member 114 would rotate, would maintain the latching member 114 in the set position so that the tooth portion 122 of the latch member 114 would be in the set position by the coiled spring 119.

During installation of the valve 22, as previously discussed in FIGS. 5 and 6, when the robotic arms 70 are pulling the flexible bolts 30 through the bolt openings 27 to secure the valve 22 against the flange 20 of the BOP 12, as the valve 22 is set in place, the tooth portion 122 of each latch 100 would be forced to recede into the opening 116 in each body portion 108 of each latch 100, until the tooth 122 has cleared the flange 20 of the BOP 12. Once each tooth 122 has cleared the BOP flange 20, the three teeth 122 would return to the latched or set position, under the force of spring 119, and in doing so, would engage the face of the flange of the valve 22 against the lower face of flange 20 of the BOP 12. At that point the robotic arms 70 could release the ends of the flexible bolts 30, since the three latches 100 are holding the flanges against one another, and the robotic arms 70 could undertake the task of securing permanent bolts into the open bolt holes in the flanges. Once that is complete, a robotic arm can tear the tear metal strap 112 away from the valve 22, which would allow each latch 100 to be disengaged from the valve by pulling on the release pull ropes 130 of each quick latch 100. Once all three latch 100 are removed, the robots 70 can fill the three bolt holes with permanent bolts, and the valve 22 is permanently secured to the BOP and can then be closed so that the flow of oil will be stopped.

The following is a list of parts and materials suitable for use in the present invention.

PARTS LIST

| Part Number | Description |
| --- | --- |
| 12 | BOP |
| 14 | rams |
| 16 | oil |
| 18 | upper end |
| 20 | upper mounting flange |
| 21 | bore |
| 22 | gate valve |
| 23 | lower mounting flange |
| 24 | cable |
| 25 | upper end |
| 27 | openings |
| 29 | valving member |
| 30 | flexible bolt |
| 31 | outer face |
| 32 | upper solid stud member |
| 34 | threaded end |
| 36 | nut |
| 37 | gaskets |
| 38 | lower end |
| 40 | wire cable |
| 42 | crimps |
| 50 | lower stud member |
| 52 | upper end |

-continued

| Part Number | Description |
| --- | --- |
| 54 | lower nut member |
| 60, 62 | upper and lower gaskets |
| 70 | robotic arms |
| 100 | quick latch |
| 102 | stud member |
| 104 | head |
| 106 | shaft portion |
| 108 | body portion |
| 112 | metal strap |
| 114 | latching member |
| 116 | opening |
| 119 | coiled spring |
| 122 | tooth portion |
| 130 | pull ropes |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A quick connect flange for securing a gate valve to a blowout preventer, comprising:
   a. a flexible member positioned around a wall of the gate valve above a flange of the valve;
   b. at least two spaced apart studs secured to the flexible member, each stud engaged into a bolt opening in the valve flange;
   c. a latch positioned on each stud, with each latch set in the inward position against an outer wall of the flange;
   d. a lower tooth member on each latch, so that when the gate valve is lowered onto the flange of the blowout preventer, each latch is forced outward until each tooth member clears the flange of the blowout preventer, and each latch returns to a closed position so that the teeth members are engaged onto a lower surface of the blowout preventer flange, and the valve is secured to the blowout preventer flange until permanent bolts are secured in place.

2. An improved apparatus for stopping oil from the end of a ruptured pipe or blowout preventer (BOP) situated on a floor of a deep body of water, which includes a flange mounted on an end of the ruptured pipe or BOP; a gate valve, having a fluid flow bore therethrough, and a flange on a lower end of the gate valve positioned onto the flange on the ruptured pipe or BOP; the improvement comprising:
   a quick connect flange for securing the gate valve to the blowout preventer, further comprising:
   a. a flexible member positioned around a wall of the gate valve above a flange of the valve;
   b. at least two spaced apart studs secured to the flexible member, each stud engaged into a bolt opening in the valve flange;
   c. a latch positioned on each stud, with each latch set in an inward position against an outer wall of the flange;
   d. a lower tooth member on each latch, so that when the gate valve is lowered onto the flange of the blowout preventer, each latch is forced outward until each tooth member clears the flange of the blowout preventer, and each latch returns to a closed position so that the teeth members are engaged onto a lower surface of the blowout preventer flange, and the valve is secured to the blowout preventer flange until permanent bolts are secured in place.

3. The apparatus in claim 2, wherein the latches are held in place on the valve by a flexible metal strap positioned around the wall of the valve.

4. The apparatus in claim 3, wherein the metal strap is removed from the valve after the permanent bolts are in place so that the latching members can be removed and replaced with permanent bolts also.

* * * * *